(12) United States Patent
Lehew et al.

(10) Patent No.: US 7,673,046 B2
(45) Date of Patent: Mar. 2, 2010

(54) TRUSTED NETWORK TRANSFER OF CONTENT USING OFF NETWORK INPUT CODE

(75) Inventors: Christian R. Lehew, Redmond, WA (US); Harry S. Pyle, Bellevue, WA (US); Nicholas Jie Fang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 10/888,132

(22) Filed: Jul. 9, 2004

(65) Prior Publication Data

US 2005/0120215 A1    Jun. 2, 2005

Related U.S. Application Data

(60) Provisional application No. 60/520,492, filed on Nov. 14, 2003.

(51) Int. Cl.
*G06F 15/173* (2006.01)
*G06F 15/16* (2006.01)
*H04L 29/06* (2006.01)
*G06F 21/00* (2006.01)

(52) U.S. Cl. .................. 709/225; 709/229; 709/232; 709/237; 713/150; 713/182

(58) Field of Classification Search .......... 709/225, 709/229, 232, 237; 713/150–194
See application file for complete search history.

(56) References Cited

U.S. PATENT DOCUMENTS

| 5,864,667 | A  | * | 1/1999  | Barkan ................... 726/10 |
| 5,987,134 | A  | * | 11/1999 | Shin et al. ............... 713/159 |
| 6,006,333 | A  | * | 12/1999 | Nielsen ................... 726/8 |
| 6,356,936 | B1 | * | 3/2002  | Donoho et al. ........... 709/206 |
| 6,385,651 | B2 | * | 5/2002  | Dancs et al. ............. 709/227 |
| 6,418,472 | B1 | * | 7/2002  | Mi et al. ................. 709/229 |
| 7,069,435 | B2 | * | 6/2006  | Sandhu et al. ........... 713/155 |
| 7,231,526 | B2 | * | 6/2007  | Hon et al. ............... 713/185 |
| 7,243,853 | B1 | * | 7/2007  | Levy et al. .............. 235/492 |

OTHER PUBLICATIONS

Muller, Thomas, Bluetooth Security Architecture Version 1.0, Jul. 15, 1999, Bluetooth White Paper.*
Arneberg, L., "Show Me Your Public Key and I Will Let Who You Are," *Telektronikk*, 2000, 96(3), 21-25.
Curtis, N. et al., "$X^2$Rep: Enhanced Trust Semantics for the XRep Protocol," *Applied Cryptography and Network Security. Second International Conference, ACNS 2004. Proceedings*, YellowMountain, China, Jun. 8-11, 2004, 205-219.
Ellison, C.M., "Establishing Identity Without Certification Authorities," *Proceedings of the Sixth Annual USENIX Security Symposium: Focusing on Applications of Cryptography*, San Jose, California, Jul. 22-25, 1996, 67-76.

(Continued)

*Primary Examiner*—Saleh Najjar
*Assistant Examiner*—Edward J Kim
(74) *Attorney, Agent, or Firm*—Woodcock Washburn LLP

(57) ABSTRACT

Systems and methods for use in connection with the trusted transmission and reception of content, such as encryption key information, from one computing device in a network to a second computing device are provided. In one embodiment, the invention provides a way to trust or validate the transfer of a public key using a very short code entered out of band of the network that is easy for end-users to remember, or write down.

40 Claims, 7 Drawing Sheets

OTHER PUBLICATIONS

Gennaro, R. et al., "RSA-Based Undeniable Signatures," *Advances in Cryptology—CRYPTO'97. 17th Annual International Cryptology Conference. Proceedings.*, Santa Barbara, California, Aug. 17-21, 1997, 132-149.

Hu, Yun-fa et al., System Integration and Authentication Technology Research on Net-Library, *Mini-Micro Systems*, 2002, 23(8), 930-934 (English language abstract included).

Kraft, D. et al., "Distributed Access Control for Consumer Operated Mobile Ad-Hoc Networks," *2004 1st IEEE Consumer Communications and Networking Conference*, Las Vegas, Nevada, Jan. 5-8, 2004, 35-40.

Patel, S., "Over the Air Service Provisioning," *Selected Areas in Cryptography. 5th Annual International Workshop, SAC'98. Proceedings*, Kingston, Ontario, Canada, Aug. 17-18, 1998, 174-189.

Sakarelis, I. et al., "Contract Based Late Security Binding," *EURESCOM. Powerful Networks for Profitable Services. Conference Proceedings*, Heidelberg, Germany, Oct. 21-24, 2002, 175-184.

Sakurai, K. et al., "Blind Decoding, Blind Undeniable Signatures, and Their Applications to Privacy Protection," *Information Hiding. First International Workshop Proceedings*, Cambridge, United Kingdom, May 30-Jun. 1, 1996, 257-264.

\* cited by examiner

FIG. 1A - Prior Art

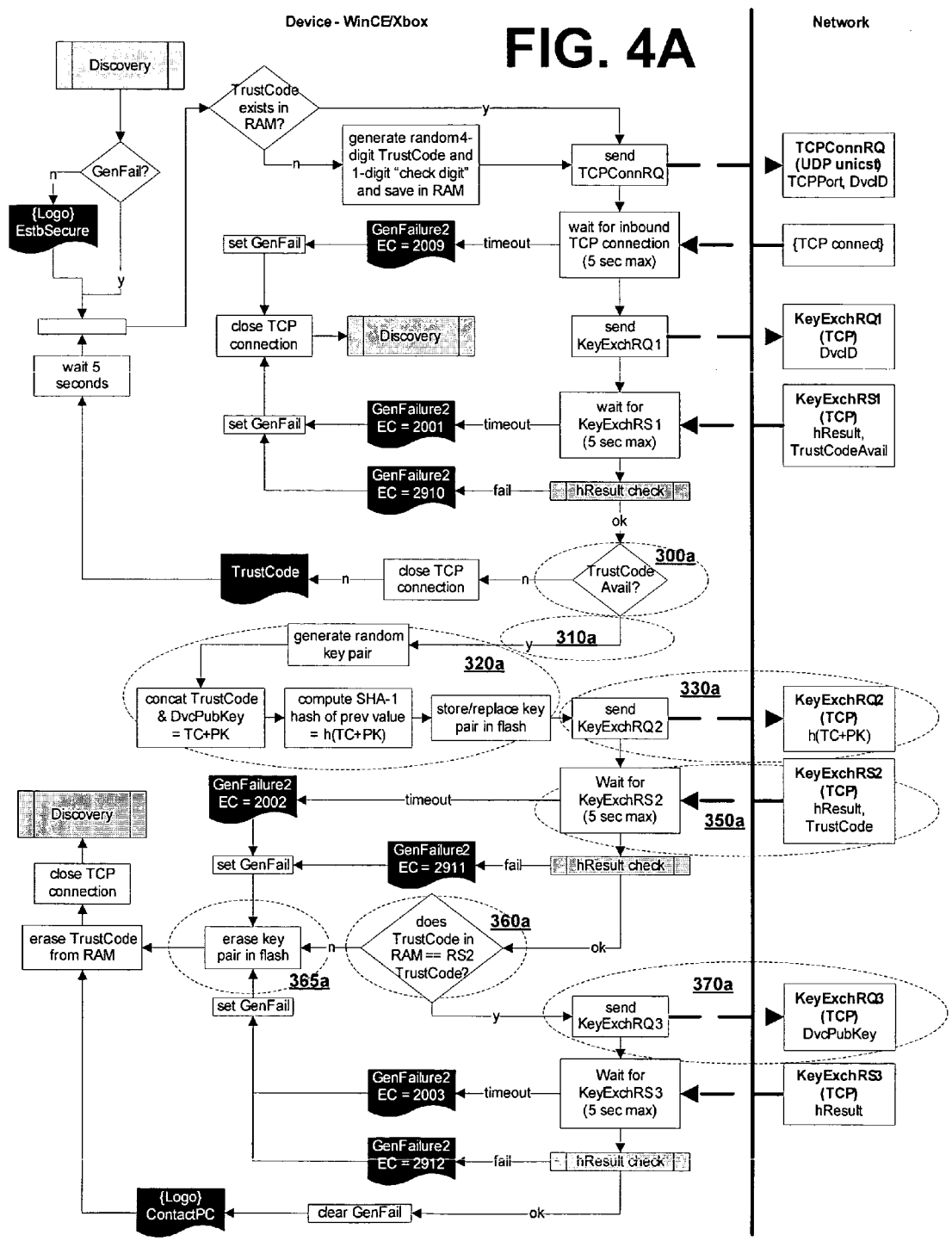

TRUSTED NETWORK TRANSFER OF CONTENT USING OFF NETWORK INPUT CODE

CROSS REFERENCE TO RELATED APPLICATION

This patent application claims benefit of U.S. Provisional Application No. 60/520,492, filed Nov. 14, 2003, entitled "Trusted Network Key Transfer Using Simple User Entered Code."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003, Microsoft Corp.

FIELD OF THE INVENTION

This invention relates to the trusted transfer of content, such as a credential, from one computing device to a second computing device in a network using a simple user entered code. More particularly, the invention relates to the trusted transmission and reception of content, such as encryption key information, from one computing device in a network to another computing device, using a simple code entered out of band of the network content exchange.

BACKGROUND

There are many reasons why it may be desirable for a first computing device to receive a credential, a resource, code, or other content from a second computing device, and/or for the second computing device to distribute or transmit the credential, resource, code, etc. to the first computing device, and vice versa. For instance, in order to give access to resource(s) of the first computing device to the second computing device, it is frequently desirable to have the first computing device "trust" something about the second computing device, e.g., for security and/or privacy reasons. Such a credential can be distributed between two computing devices in any computing environment, e.g., network architectures that include peer-to-peer clients, distributed computing systems, thin-client architectures where application processing occurs mainly on a central server, but can be distributed as well.

FIG. 1A generally illustrates computing between a first computing device (e.g., server S) and a second computing device (e.g., client C) in an exemplary networked environment. Server S and client C communicate over any network connection NC, whether wired or wireless. For instance, server S may wish to trust client C before delivering access to Application A, or client C may wish to trust server S before it accepts a credential, or other content from the client C. Or, a first computing device S may wish to receive a public key from second computing device C, or vice versa. Methods for establishing trust between the devices via a simple mechanism are thus desired for a full range of communications among computing devices.

As illustrated in FIG. 1B, the world of computing devices and types of content that may be requested from various other computing devices is quite diverse, both in terms of media devices and media types. For exemplary purposes only, FIG. 1B illustrates that there are many kinds of media, such as music (MP3s, WMVs, etc.), streaming audio/video, photos (JPEGS, GIFs, etc.), movie files (MOVs, MPEG, etc.), advertisements, broadcast media (Radio, TV, Cable, etc.), graphics data, etc. FIG. 1B also illustrates that there are a variety of devices that render media in some fashion, for some purpose. These devices include, but are not limited to, televisions, radios, tuners, DVD players, VCRs, DVRs, digital media rendering devices, set top boxes, MP3 players, Smart Display devices, laptops, gaming machines, remote control devices, cell phones, PDAs, digital picture frames, etc. Given the disparate number of devices and locations where digital content may be stored, establishing trust automatically among any two devices with simplicity in such a system is thus an important problem, in order to enable sharing of content or resources among a variety of computing devices in what becomes an established trust enclave of devices. It is thus desirable to have a generic and simple mechanism or framework for trusting the content of an exchange between a first device and a second device, or vice versa.

For another example of when trust is desirable in a computing system as between a plurality of computing devices, a common method to securely transfer information securely between one place and another on a network is by using public/private key cryptography. If one machine obtains a public key and another machine has the matching private key, the first machine can encrypt secret information using the public key and trust that only a machine holding that matching private key will be able to decrypt it. Without a trusted transfer of the public key from one place in the network to another place, however, there is no way to ensure that a malicious machine sitting on the network did not intercept the intended public key during its transmission and replace it with its own.

Thus, building trust into the exchange of the public key, or any content, via a simple mechanism or method is desired. It would be further desirable to be able transmit any content, such as a public key, from one place to another over a network in a way that can be trusted, so that the second machine knows for sure that the content that it is receiving in fact came from the "real" fist machine. In addition, it would be desirable to have systems, application programming interfaces, code implementations, user interfaces and protocols for achieving the above-described objectives to obtain the trusted results.

SUMMARY OF THE INVENTION

In consideration of the above-identified shortcomings of the art, for use in connection with establishing trust for content delivered to a first device from a second device, the present invention provides systems and methods for use in connection with the trusted transmission and reception of content, such as encryption key information, from one computing device in the network to a second computing device, or vice versa. In one embodiment, the invention provides a way to trust a public key on a network using a very short code displayed on one machine and entered out of band on the second machine, wherein the code is easy for end-users to remember. Accordingly, a user can receive a simple code at the first machine and enter the simple code out of hand at the second machine, without difficulty, thereby establishing implicit trust in the ensuing content exchange, which may include the transmission of a trusted public key. The trust established by the techniques of the invention includes both (a) trust by the first computing device that the second computing device is the appropriate target for the delivery of content from the first computing device and (b) trust by the second computing device that the first computing device is a trusted source for the content.

Other advantages and features of the invention will also be apparent from the description below.

BRIEF DESCRIPTION OF THE DRAWINGS

The systems and methods for trusting content to be transferred from a first computing device to a second computing device in accordance with the present invention are further described with reference to the accompanying drawings in which:

FIG. 1A illustrates an exemplary prior art networked computing environment in which first and second computing devices communicate;

FIGS. 4A and 4B together represent one non-limiting, exemplary flow diagram of an implementation of the invention, illustrating merely one set of algorithms, timing, interfaces and protocols that can be using to achieve the trusted transfer of content, such as a public key, in accordance with the invention.

DETAILED DESCRIPTION OF THE INVENTION

Overview

Figure 1B:
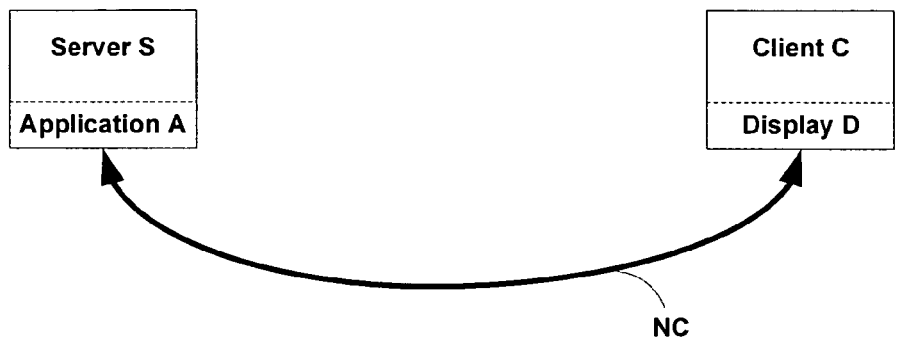
FIG. 1B illustrates how diverse media types and media devices are when it comes to providing a digital content experience.
Figure 1B:
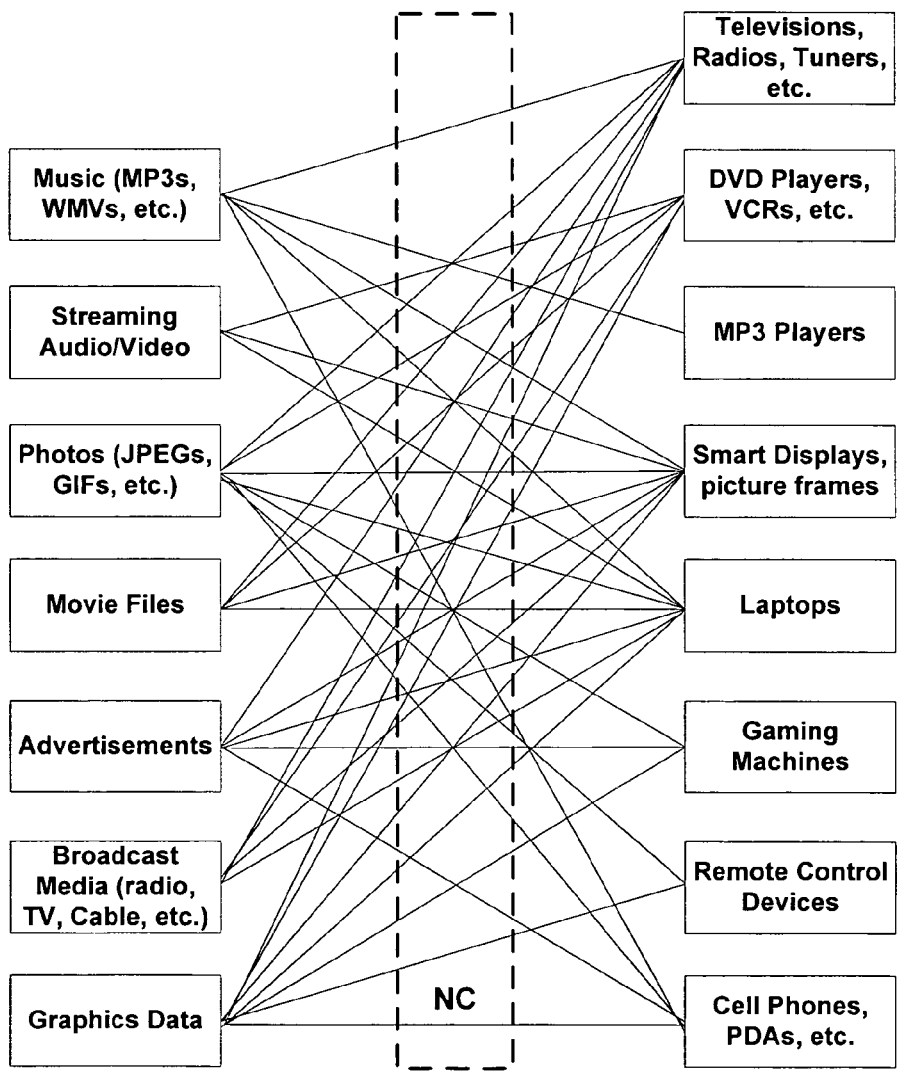

As an example of when a second computing device may wish to receive a content in a trusted manner from a first computing device, recent improvements in the way consumers interact with their computers include the introduction of a broad ecosystem of networked devices that deliver entertainment experiences (such as TV, music, videos, photographs, DVD's, etc) throughout the home on a variety of devices (such as electronic home remote media devices, digital media rendering devices, DVRs, set top boxes, Smart Displays, xBoxes, pocket PCs, portable DVD devices, and the like). Before such content can be delivered to a requesting computing device, however, trust must be established between the requesting device and the device with the content. For instance, receiving the public key from one of the devices, assuming it may be trusted as coming from the appropriate source and targeted for the appropriate destination, is valuable for ensuring that subsequent exchanges of media between the devices are not exposed on the network when being delivered because they may be encrypted accordingly. Thus, in one non-limiting embodiment, the invention provides a generic framework for automatically transmitting content, such as a public key, to another device in a simple, trusted manner.

Exemplary Networked Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with establishing trusted communications in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. With network sources for digital media proliferating more than ever, the invention is particularly relevant to those computing devices operating in a network or distributed computing environment, and thus the techniques for establishing trust for the delivery of content in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power and storage to benefit the entire enterprise. In this regard, a variety of devices may have applications, objects or resources that may implicate an ancillary desire for trusted communications, as may be established in accordance with the invention.

Figure 2A:
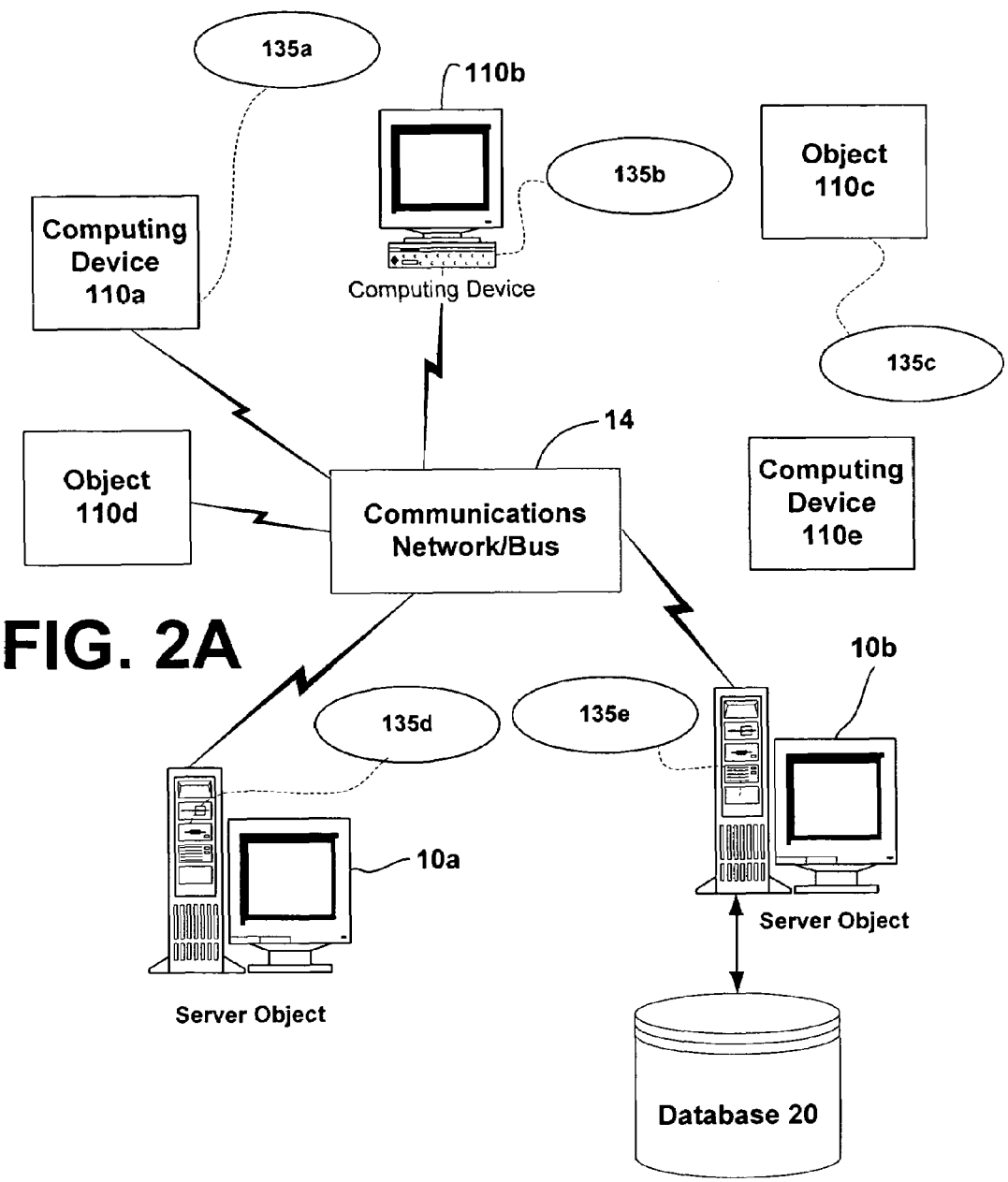
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, TVs, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each of the objects 10a, 10b, etc. or 110a, 110b, 110c, etc. may contain an application that might make use of an interface, such as an API, or other object, software, firmware and/or hardware, to request or make use of the processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects, or any device that may be utilized in connection with a media experience.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the distribution of credential(s) according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which request or make use of the processes for establishing trust among computing devices in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. For instance, computer 110a may be a Media Center Edition (MCE) host PC, and computing devices 10a, 10b, etc. may be remote media consumption devices. Any of these computing devices may be processing data or requesting services or tasks that may implicate a trusted content exchange in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." For instance, Remote Desktop Protocol (RDP) is a common protocol utilized for remote computing. Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device with unique media abilities when it comes to storage, user interface, rendering, etc.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
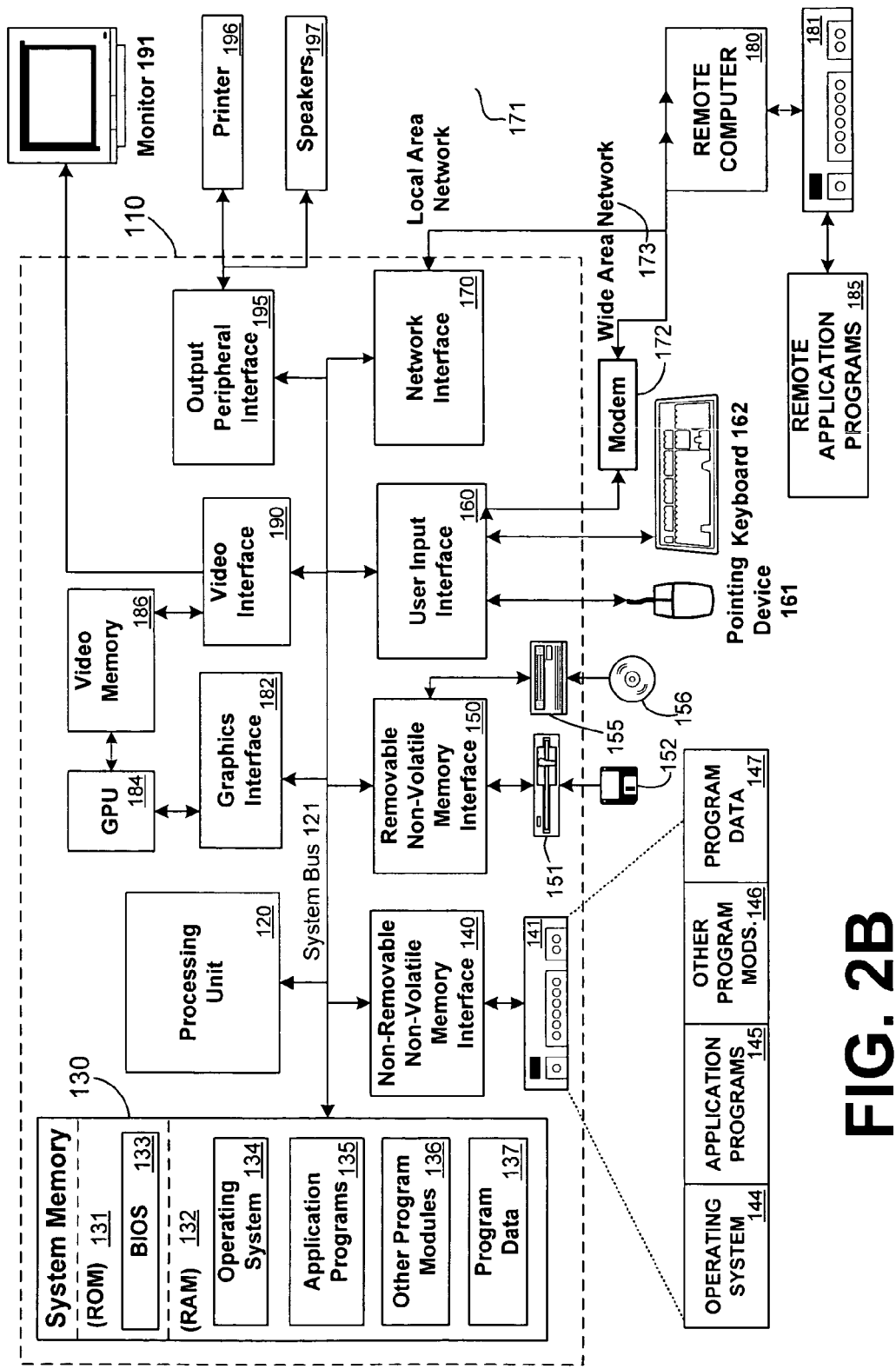
FIG. 2B is a block diagram representing a first exemplary non-limiting computing device, whether receiving or delivering content, in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that media may be experienced in a computing environment such as anywhere there is a display or other output device. While a general purpose computer is described below as an exemplary host, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the delivery of trusted content in accordance with the invention.

Although not required, the invention can be implemented via an operating system, for use by a developer of services for a device or object, and/or included within application software that operates in connection with the delivery or receipt of a trusted credential, such as a public key, in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, another exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Remote Device

Figure 2C:
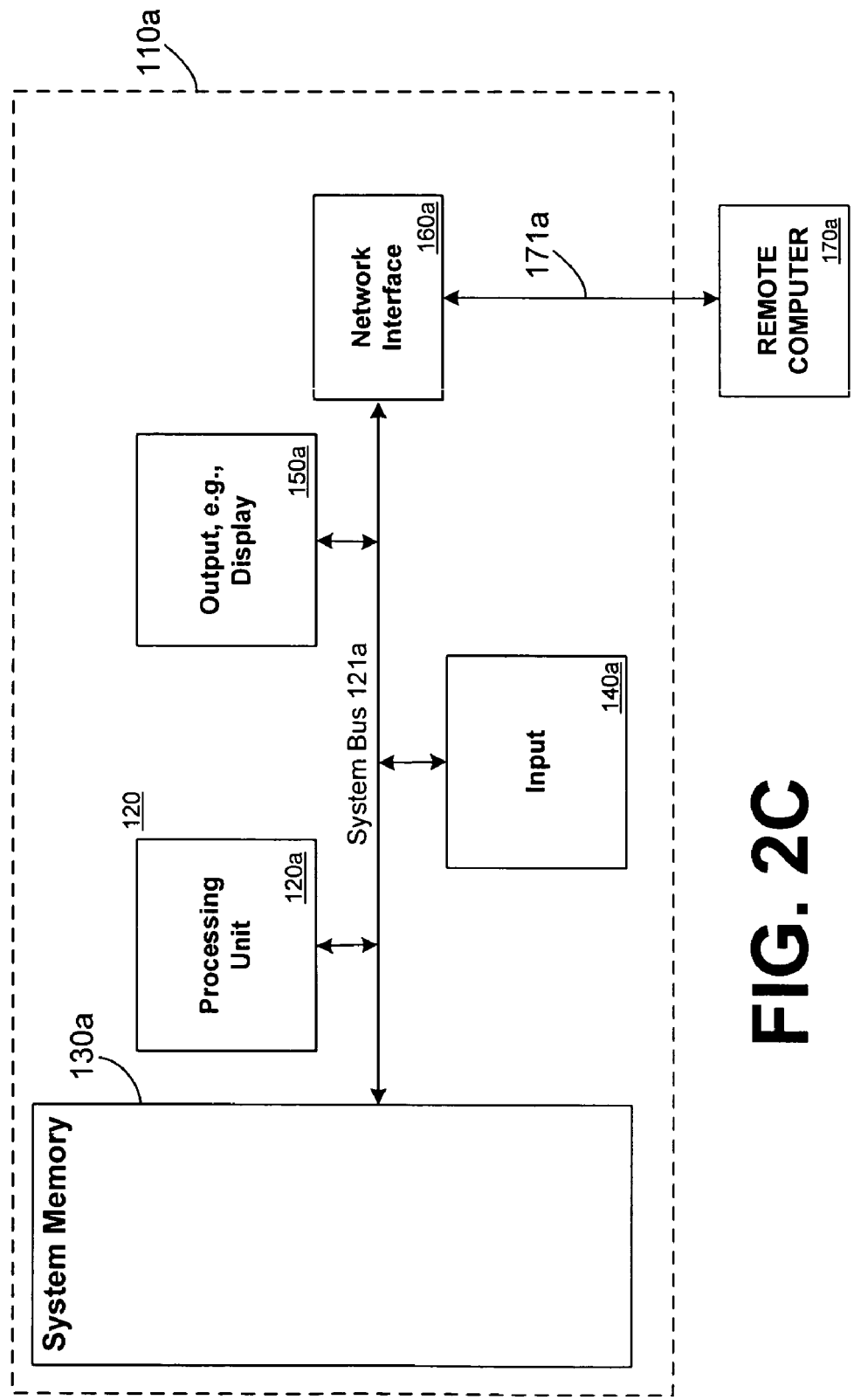
FIG. 2C is a block diagram representing a second exemplary non-limiting computing device, whether receiving or delivering content, in which the present invention may be implemented.

FIG. 2C and the following discussion are intended to provide a brief general description of a suitable computing environment for a remote media device in accordance with the invention. It should be understood, however, that handheld, portable and other computing devices and computing objects of all kinds are contemplated for use in connection with the present invention, i.e., anywhere that a device may wish to request the delivery of a custom remote media experience for the device. The differences in these devices in terms of media capabilities makes use of the invention of significant advantage—to tailor remote media experiences to different remote devices. Accordingly, the below general purpose remote computer described below is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques in accordance with the invention.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2C thus illustrates an example of a suitable computing system environment 100a in which the invention may be implemented, although as made clear above, the computing system environment 100a is only one example of a suitable computing environment for a remote device and is not intended to suggest any limitation as to the scope of use or functionality of the invention. Neither should the computing environment 100 be interpreted as having any dependency or requirement relating to any one or combination of components illustrated in the exemplary operating environment 100a.

With reference to FIG. 2C, a second exemplary device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. As discussed above, computer readable media can be any available media that can be accessed by computer 110a. The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media, which may be connected to the system bus 121a through a non-removable memory interface such as an interface, and a magnetic disk drive or optical disk drive is typically connected to the system bus 121a by a removable memory interface, such as an interface.

A user may enter commands and information into the computer 110a through a variety of input devices. A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2C include a network 171a, such local area network (LAN) or a wide area network (WAN), but may also include other networks/buses. Such networking environments are commonplace in homes, offices, enterprise-wide computer networks, intranets and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods of the invention may be included in, supported in or accessed via all of the languages and services enabled by managed code, such as .NET code, and in other distributed computing frameworks as well.

Trusted Network Content Transfer Using a Simple Code Transported Off the Network As mentioned, the present invention provides systems and methods for use in connection with the trusted transmission and reception of content, such as encryption key information, from one computing device in the network to a second computing device. In one embodiment, the invention provides a way to transfer the public key using a very short code that is much easier for end-users to remember or write down, which is output from the first device and input to the second device out of band.

Establishing trust in a robust and secure way usually relies on protection against computationally intense brute-force attacks. For an end-user, this translates into the user being required to write down or in some other way interact with a very long number or alpha-numeric value, e.g., a product code, or some other value that is immune from a brute force attack on its value—that is, the value is made very big by design so that it is difficult for an attacker to discover via a dictionary attack (try all possibilities and guess it). The invention thus enables a mechanism to establish trust in a way that is very "user friendly" by eliminating brute-force attacks; while at the same time, the user only has to deal with a very short value because the attacker only gets one attempt to guess it. Thus, the code of the invention need only be long enough to reduce the likelihood that an attacker will gain access with a single guess. In this respect, the invention achieves a balance between security and privacy on the one hand (ensuring that no one could ever gain access or pose as a legitimate device in such a system) and user experience (simplicity of the code, reduction of burden on the user remembering and inputting the code).

Thus, in an exemplary process in accordance with the invention, machine #1 is attempting to transfer content, such as its public key, to machine #2, and machine #2 needs to know (to trust) that the key it receives definitely comes from machine #1. In accordance with one embodiment of the invention, the user is shown a short code on a display by machine #1 which the user writes down or remembers, and then the user physically goes to machine #2 and enters in that code. After this is done, the two machines perform a few brief exchanges over the network which first locks the public key to be exchanged to the short code, then actually transfers the public key. If a problem arises at any stage in the communication, the entire process is effectively or completely aborted, the short code is thrown away and/or the public/private key pair is invalidated for future use. While the user may remember the code and input the code to machine #2, the invention advantageously recognizes that any out of band transport of the code initiated by the user achieves the same effect. For instance, a user could initiate a separate modem transfer of the code, or place a USB memory stick in the first device, receive the code, and then place the USB memory stick in the second device and thereby input the code to the second device.

Figure 3A:
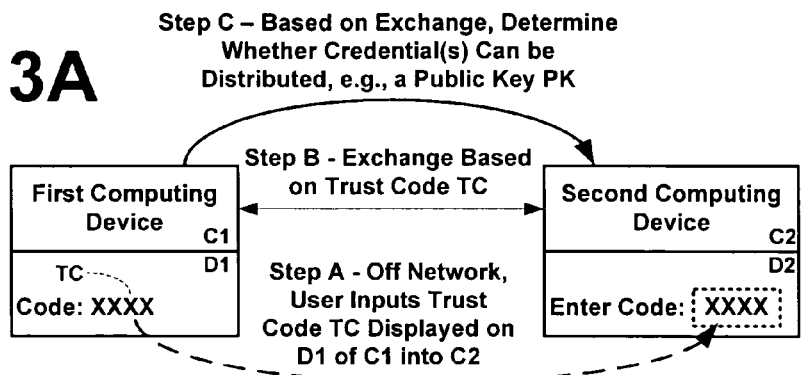
FIGS. 3A and 3B illustrate the trusted exchange of content from a first computing device to a second computing device, or vice versa, according to a code input out of band in accordance with various embodiments of the systems and methods of the invention.
Figure 3A:
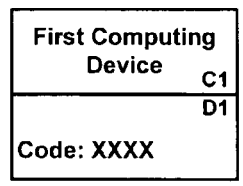
Figure 3B:
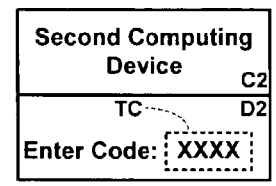
Figure 3B:
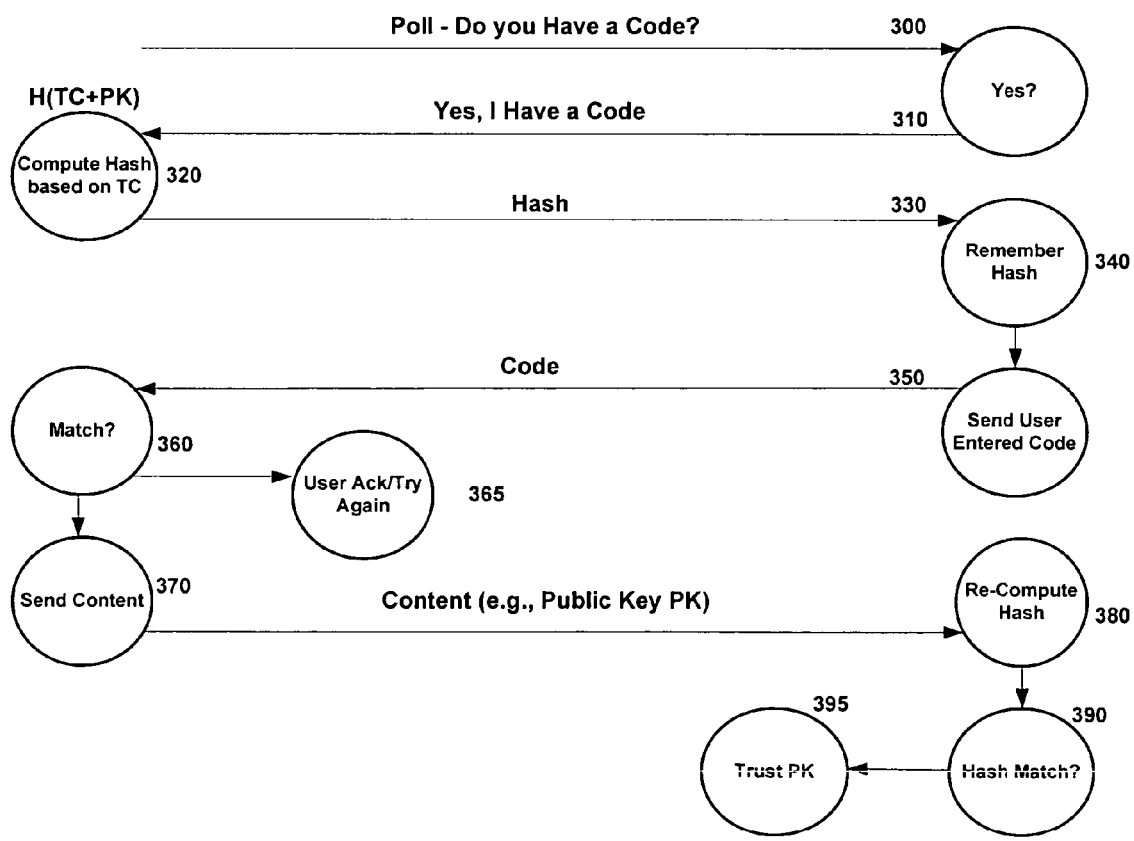

Exemplary embodiments of the invention are illustrated further with reference to FIGS. 3A and 3B. In FIG. 3A, a first computing device C1 is to deliver content, such as a public key, to a second computing device over a network connection in a manner such that the second computing device C2 trusts that the content comes from the first computing device C1. In Step A, a trusted code TC is displayed via a user interface, such as a display D1, or otherwise provided to the user by the first computing device C1. Off the network, the user enters the code TC into the second computing device via well known input means, such as a keyboard, mouse, user interface, etc. At step B, an exchange is made between the first and second computing devices on the network which is based on code TC. At step C, based on the exchange, a determination is made whether the first computing device C1 can be trusted, and if so, the content, such as a public key, is transmitted. It can be appreciated that the above-described process can work from the second computing device C2 to the first computing device C1 as well, and also operates to establish bi-directional trust in connection with the content exchange (right delivery device, and right recipient device).

FIG. 3B illustrates an exchange according to the process of FIG. 3A in exemplary implementation detail. At 300, via a polling, interrupt, or equivalent discovery mechanism and corresponding interfaces, first computing device C1 determines whether the second computing device C2 has a code. When second computing device C2 has a code due to the user entering a code TC, at 310, the second computing device C2 so indicates to the first computing device C1. At 320, in one non-limiting embodiment, a hash based on: (a) the trusted code TC (originally generated by and displayed on the first computing device C1) and (b) the content to be delivered (e.g., public key) is computed and sent to the second computing device C2 at 330. The second computing device C2 stores (remembers) the Hash at 340 and at 350, the trusted code entered in by the user at the second computing device C2 is transmitted to the first computing device C1.

At 360, a determination is made by the first computing device C1 whether or not user entered code has a pre-defined relationship to (e.g., matches or is similar enough to) the code TC generated by the first computing device C1. If not, an error code or the like is displayed at 365 and the user can try again. If the codes possess the pre-defined relationship (e.g., match, i.e., the algorithm associated with 360 determines that the user entered code is the same as the code TC generated by first computing device C1), then the flow proceeds to 370, whereby the communication is trusted, and the content (e.g., public key) is sent to the second computing device C2. Once the content is received by the second computing device C2, the hash based on the trusted code and the content is re-computed and compared to the hash remembered at 340. At 390, if the two hashes match according to the matching algorithms, the content (e.g., public key) from the first computing device C1 can thus be trusted by the second computing device C2 at 395 in accordance with the invention. Moreover, due to the two-sided matching of information, the first computing device C1 can trust that the second computing device C2 is the right target for the delivery of the content.

Figure 4B:
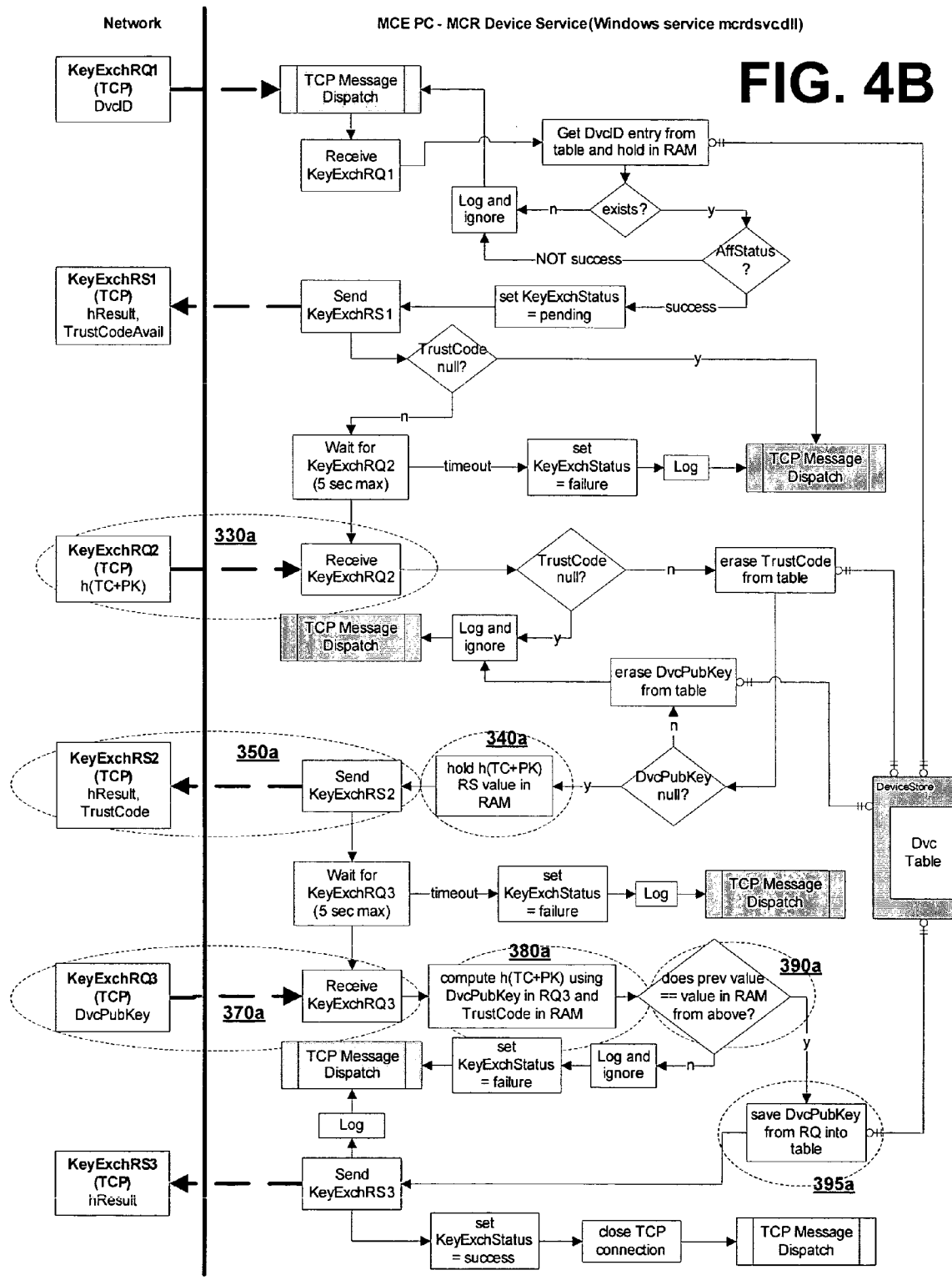

FIGS. 4A and 4B illustrate exemplary non-limiting flow diagrams representing processes performed and protocols that may be followed in connection with an embodiment of the trusted content transfer systems and methods of the invention. For instance, portions of FIG. 4A are recognizable as non-limiting implementations corresponding to the flow diagram of FIG. 3A by way of the dashed lines and corresponding similar numbering (e.g., reference 300 of FIG. 3A becomes reference 300a in FIGS. 4A-B, 310 of FIG. 3A becomes 310a in FIGS. 4A-B, and so on). However, it should be clear that FIGS. 4A and 4B merely illustrate one implementation of the exemplary communications that may occur between devices from a processing, interface and protocol standpoint, and it should be emphasized that the invention may be implemented with a variety of other processes, protocols, matching algorithms and the like. For instance, one can appreciate that a comparison or matching algorithm can assume an infinite number of mathematical shapes and forms, and that the key consideration is whether the comparison or matching algorithms discerns or determines whether two codes are the same or similar according to some pre-defined relationship, in any explicit or implicit form.

It should also be appreciated that the invention performs the above-described authentication communications between devices on a network set up for data exchange between the devices, and that a unique aspect of the present invention is the initial transport of the trust code from the first device to the second device occurs off the network (out-of-band). There are a variety of ways to transport a code from one computing device to a second computing device, or vice versa. As mentioned, one way is described above wherein the user reads (and remembers, or potentially writes down) a trust code from the first device and enters the code into the second device. Another simple way would be to plug or insert a memory device (such as a USB memory device, or memory stick, or CD-RW, or DVD-RW) into both the first and second computing device to both receive and deliver the trust code off the network. Another way would be to use a phone line, mobile network, or other connection between the devices which provides an alternate delivery mechanism which is off the network for the authentication exchange.

As mentioned, an advantage of the invention is that the trust code TC is easy to remember for the out of band transport from one device to another. In one non-limiting embodiment, the Trust Code is an N-digit number (e.g., 4 digits) that is randomly generated each time it is created. The 4-digit Trust Code is combined with the 3-digit AffCode (computed form the MAC address ... always the same for a given device), then a one digit "check digit" is computed and added to the end. These numbers create an 8-digit "Security Code". In a non-limiting embodiment, the algorithm used to generate the check digit is borrowed from standards applied to universal price code (UPC) symbols.

For instance, what follows is an example of how to generate a complete 8-digit code: (1) Combine the 4-digit Trust Code and the 3-digit AffCode to form a 7-digit number; (2) Add the 1st, 3rd, 5th, and 7th digits together then multiply the sum by 3; (3) Add the 2nd, 4th, and 6th digits together; (4) Add the result from (2) to the result from (3) and subtract this from the next multiple of 10; and (5) the result of the subtraction is the "check digit" which becomes the 8th digit of the code (if the sum of (2) and (3) is already a multiple of 10 then the check digit is zero). Exemplary math follows:

Example: TrustCode=8423, AffCode=509

$$8423509=[((8+2+5+9)*3)+(4+3+0)]=80-[72+7]=1=84235091$$

In accordance with the above procedure, to allow some minimal error in input, there is built in a kind of fuzzy logic which enables the end-user to input the code out of band partially incorrectly, but still be validated nonetheless.

There are multiple ways of implementing the present invention, e.g., an appropriate API, tool kit, driver code, operating system, control, standalone or downloadable software object, etc. which enables applications and services to use trust mechanism of the invention. The invention contemplates the use of the invention from the standpoint of an API (or other software object), as well as from a software or hardware object that receives or transmits media capabilities via the mechanism of the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to trust content from a first computing device by another computing device. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the media capabilities mechanism(s) of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer or distributed networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular protocols and communications, the invention is not so limited, but rather any protocol may be implemented to provide a general framework for establishing trusted exchange of content in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method implemented in a computing system for transmitting content from a first computing device to a second computing device in a network, comprising:

generating, by the first computing device without receiving user input, a trust code;

transporting the generated trust code from the first computing device to the second computing device, said transporting comprising displaying, by the first computing device, the generated trust code, and receiving, at the second computing device via a user interface, a trust code; and performing an authentication exchange between the first computing device and the second computing device across the network comprising at the first computing device comparing the received trust code to the generated trust code, and when the received trust code does not have a pre-defined relationship with the generated trust code, determining the content is not trusted for delivery to the second computing device, wherein performing an authentication exchange between the first computing device and the second computing device further comprises:

the first computing device polling the second computing device as to whether the second computing device has a code;

the second computing device communicating to the first computing device that the second computing device has a code;

the first computing device creating a hash based on the generated trusted code and content to be delivered, and delivering the hash from the first computing device to the second computing device;

the second computing device storing the hash;

the second computing device transmitting the inputted trust code to the first computing device;

the first computing device determining whether or not the inputted trust code has a pre-defined relationship to the generated trust code, determining whether or not the inputted trust code has a pre-defined relationship comprising comparing the inputted trust code to the generated trust code;

transmitting an error from the first computing device to the second computing device if the inputted trust code does not have a pre-defined relationship to the generated trust code;

transmitting the content from the first computing device to the second computing device if the inputted trust code does have a pre-defined relationship to the generated trust code; and computing a hash value at the second computing device based on the inputted trust code and the content and determining if the computed value matches the stored hash value.

2. A method according to claim 1, wherein the content is a credential of the first computing device.

3. A method according to claim 2, wherein the credential is a public key.

4. A method according to claim 1, wherein said receiving an inputted trust code includes allowing the inputted trust code to be entered at most once to the second computing device, so that there are no second tries with respect to comparing said inputted code and said generated code.

5. A method according to claim 1, wherein said comparing comprises calculating a security code, the security code comprising the inputted trust code, a fixed code assigned to the computing device performing the comparison, and at least one check digit computed based on the inputted trust code and the fixed code.

6. A method according to claim 1, wherein said transporting includes:

receiving a component into the first computing device;

transmitting the trust code onto the component from the first computing device;

receiving the component into the second computing device;

retrieving the trust code from the component at the second computing device.

7. A method according to claim 6, wherein the component is a memory component inserted into at least one data port of the respective first and second computing devices.

8. A method according to claim 1, wherein if said inputted trust code does not have the pre-defined relationship with said generated trust code, the content is not delivered to the second device.

9. A method according to claim 1, wherein if said inputted trust code does not have the pre-defined relationship with said generated trust code, and said content is a public key, a private key associated with the public key and the public key of the first computing device are invalidated for future use.

10. A method according to claim 1, wherein if said inputted trust code does not have the pre-defined relationship with said generated trust code, the trust code is invalidated for future use, unless independently randomly generated in the future.

11. A computer readable storage medium comprising computer executable instructions for carrying out the method comprising of:

generating, by the first computing device without receiving user input, a trust code;

transporting the generated trust code from the first computing device to the second computing device, said transporting comprising displaying, by the first computing device, the generated trust code, and receiving, at the second computing device via a user interface, a trust code; and performing an authentication exchange between the first computing device and the second computing device across the network comprising: at the first computing device comparing the received trust code to the generated trust code, and when the received trust code does not have a pre-defined relationship with the generated trust code, determining the content is not trusted for delivery to the second computing device, wherein performing an authentication exchange between the first computing device and the second computing device further comprises:

the first computing device polling the second computing device as to whether the second computing device has a code;

the second computing device communicating to the first computing device that the second computing device has a code;

the first computing device creating a hash based on the generated trusted code and content to be delivered, and delivering the hash from the first computing device to the second computing device;

the second computing device storing the hash;

the second computing device transmitting the inputted trust code to the first computing device;

the first computing device determining whether or not the inputted trust code has a pre-defined relationship to the generated trust code, determining whether or not the inputted trust code has a pre-defined relationship comprising comparing the inputted trust code to the generated trust code;

transmitting an error from the first computing device to the second computing device if the inputted trust code does not have a pre-defined relationship to the generated trust code;

transmitting the content from the first computing device to the second computing device if the inputted trust code does have a pre-defined relationship to the generated trust code; and computing a hash value at the second computing device based on the inputted trust code and the content and determining if the computed value matches the stored hash value.

12. A method implemented in a computing system for transmitting content from a first computing device to a second computing device in a network, comprising:

generating, by the second computing device without receiving user input, a trust code;

transporting the generated trust code from the second computing device to the first computing device, said transporting comprising displaying, by the second computing device, the generated trust code, and receiving, at the first computing device via a user interface, a trust code; and performing an authentication exchange between the first computing device and the second computing device across the network, comprising at the first computing device comparing the received trust code to the generated trust code, and when the received trust code does not have a pre-defined relationship with the generated trust code, determining the content is not trusted for delivery to the second computing device, wherein performing an authentication exchange between the first computing device and the second computing device further comprises:

the first computing device polling the second computing device as to whether the second computing device has a code;

the second computing device communicating to the first computing device that the second computing device has a code;

the first computing device creating a hash based on the generated trusted code and content to be delivered, and delivering the hash from the first computing device to the second computing device;

the second computing device storing the hash;

the second computing device transmitting the inputted trust code to the first computing device;

the first computing device determining whether or not the inputted trust code has a pre-defined relationship to the generated trust code, determining whether or not the inputted trust code has a pre-defined relationship comprising comparing the inputted trust code to the generated trust code;

transmitting an error from the first computing device to the second computing device if the inputted trust code does not have a pre-defined relationship to the generated trust code;

transmitting the content from the first computing device to the second computing device if the inputted trust code does have a pre-defined relationship to the generated trust code; and computing a hash value at the second computing device based on the inputted trust code and the content and determining if the computed value matches the stored hash value.

13. A method according to claim 12, wherein the content is a credential of the second computing device.

14. A method according to claim 13, wherein the credential is a public key.

15. A method according to claim 12, wherein said receiving includes specifying the inputted trust code at most once to the first computing device, so that there are no second tries with respect to comparing said comparison code.

16. A method according to claim 12, wherein said comparing comprises calculating a security code, the security code comprising the inputted trust code, a fixed code assigned to the computing device performing the comparison, and at least one check digit computed based on the inputted trust code and the fixed code.

17. A method according to claim 12, wherein said transporting includes: inserting a component into the second computing device to receive the generated trust code; and inserting the component into the first computing device to deliver the inputted trust code.

18. A method according to claim 17, wherein the component is a memory component inserted into at least one data port of the respective second and first computing devices.

19. A method according to claim 12, wherein if said inputted trust code does not have the pre-defined relationship with said generated trust code, the content is not delivered to the first device.

20. A method according to claim 12, wherein if said inputted trust code does not have the pre-defined relationship with said generated trust code, and said content is a public key, a private key associated with the public key and the public key of the second computing device are invalidated for future use.

21. A method according to claim 12, wherein if said inputted trust does not have the pre-defined relationship with said generated trust code, the trust code is invalidated for future use, unless independently randomly generated in the future.

22. A computer readable storage medium comprising computer executable instructions for carrying out the method comprising of, generating, by the second computing device without receiving user input, a trust code;

transporting the generated trust code from the second computing device to the first computing device, said transporting comprising displaying, by the second computing device, the generated trust code, and receiving, at the first computing device via a user interface, a trust code; and performing an authentication exchange between the first computing device and the second computing device across the network, comprising:

at the first computing device comparing the received trust code to the generated trust code, and when the received trust code does not have a pre-defined relationship with the generated trust code, determining the content is not trusted for delivery to the second computing device, wherein performing an authentication exchange between the first computing device and the second computing device further comprises:

the first computing device polling the second computing device as to whether the second computing device has a code;

the second computing device communicating to the first computing device that the second computing device has a code;

the first computing device creating a hash based on the generated trusted code and content to be delivered, and delivering the hash from the first computing device to the second computing device;

the second computing device storing the hash;

the second computing device transmitting the inputted trust code to the first computing device;

the first computing device determining whether or not the inputted trust code has a pre-defined relationship to the generated trust code, determining whether or not the inputted trust code has a pre-defined relationship comprising comparing the inputted trust code to the generated trust code;

transmitting an error from the first computing device to the second computing device if the inputted trust code does not have a pre-defined relationship to the generated trust code;

transmitting the content from the first computing device to the second computing device if the inputted trust code does have a pre-defined relationship to the generated trust code; and computing a hash value at the second computing device based on the inputted trust code and the content and determining if the computed value matches the stored hash value.

23. A method implemented in a computing system for transmitting content from a first computing device to a second computing device in a network, comprising:

generating, by the first computing device without receiving user input, a trust code;

transporting the generated trust code from the first computing device to the second computing device, said transporting comprising displaying, by the first computing device, the generated trust code, and receiving, at the second computing device via the user interface, an inputted trust code;

performing an authentication exchange between the first computing device and the second computing device, comprising:

the first computing device polling the second computing device as to whether the second computing device has a code;

the second computing device communicating to the first computing device that the second computing device has a code;

the first computing device creating a hash based on the generated trusted code and content to be delivered, and delivering the hash from the first computing device to the second computing device;

the second computing device storing the hash;

the second computing device transmitting the inputted trust code to the first computing device;

the first computing device determining whether or not the inputted trust code has a pre-defined relationship to the generated trust code, determining whether or not the inputted trust code has a pre-defined relationship comprising comparing the inputted trust code to the generated trust code;

transmitting an error from the first computing device to the second computing device if the inputted trust code does not have a pre-defined relationship to the generated trust code;

transmitting the content from the first computing device to the second computing device if the inputted trust code does have a pre-defined relationship to the generated trust code; and computing a hash value at the second computing device based on the inputted trust code and the content and determining if the computed value matches the stored hash value.

24. A method according to claim 23, wherein said content is a public key.

25. A method according to claim 24, wherein said hashing algorithm is based on said public key and said trust code.

26. A device for use in connection with establishing trust for the delivery of content from a first computing device to a second computing device over a network, comprising:

computing memory;

an input communicatively coupled to the computing memory, the input for receiving a generated trust code generated by a first computing device in response to being inserted in the first computing device; and an output communicatively coupled to the computing memory, the output for outputting the generated trust code, off the network, in response to being inserted in the second computing device, the trust code once delivered off the network being an inputted trust code;

wherein, in response to said second computing device receiving the trust code, an authentication exchange occurs between the first computing device and the second computing device on the network, and when the inputted trust code does not have a pre-defined relationship with the generated trust code, determining the content is not trusted for delivery to the second computing device, wherein an authentication exchange occurring between the first computing device and the second computing device, comprising:

the first computing device polling the second computing device as to whether the second computing device has a code;

the second computing device communicating to the first computing device that the second computing device has a code;

the first computing device creating a hash based on the generated trusted code and content to be delivered, and delivering the hash from the first computing device to the second computing device;

the second computing device storing the hash;

the second computing device transmitting the inputted trust code to the first computing device; and the first computing device determining whether or not the inputted trust code has a pre-defined relationship to the generated trust code, determining whether or not the inputted trust code has a pre-defined relationship comprising comparing the inputted trust code to the generated trust code;

transmitting an error from the first computing device to the second computing device if the inputted trust code does not have a pre-defined relationship to the generated trust code;

transmitting the content from the first computing device to the second computing device if the inputted trust code does have a pre-defined relationship to the generated trust code; and computing a hash value at the second computing device based on the inputted trust code and the content and determining if the computed value matches the stored hash value.

27. A device according to claim 26, wherein the device is inserted into at least one data port of the respective first and second computing devices.

28. A computer system adapted to transmit content between a first device and a second device in a trusted manner in a network, comprising:
means for generating, without user input, a trust code on the first computing device;
  means for transporting the generated trust code, off the network, from the first computing device to the second computing device, said transporting comprising displaying, by the first computing device, the generated trust code, and receiving, by the second computing device, the transported trust code inputted via a user interface into the second computing device; and
  means for performing an authentication exchange between the first computing device and the second computing device on the network comprising at the first computing device comparing the inputted transported trust code to the generated trust code, and when the inputted transported trust code does not have a pre-defined relationship with the generated trust code, determining the content is not trusted for delivery to the second computing device,
wherein performing an authentication exchange between the first computing device and the second computing device, comprising:
  the first computing device polling the second computing device as to whether the second computing device has a code;
  the second computing device communicating to the first computing device that the second computing device has a code;
  the first computing device creating a hash based on the generated trusted code and content to be delivered, and delivering the hash from the first computing device to the second computing device;
  the second computing device storing the hash;
  the second computing device transmitting the inputted trust code to the first computing device;
  the first computing device determining whether or not the inputted trust code has a pre-defined relationship to the generated trust code, determining whether or not the inputted trust code has a pre-defined relationship comprising comparing the inputted trust code to the generated trust code;
  transmitting an error from the first computing device to the second computing device if the inputted trust code does not have a pre-defined relationship to the generated trust code;
  transmitting the content from the first computing device to the second computing device if the inputted trust code does have a pre-defined relationship to the generated trust code; and
  computing a hash value at the second computing device based on the inputted trust code and the content and determining if the computed value matches the stored hash value.

29. A system according to claim 28, wherein the content is a public key.

30. A system according to claim 28, wherein said means for transporting includes:
  means for displaying the generated trust code via the first computing device; and
  means for inputting the inputted trust code to the second computing device as said inputted trust code.

31. A system according to claim 30, wherein said means for inputting includes specifying the inputted trust code at most once to the second computing device, so that there are no second tries by said means for comparing said inputted trust code and said generated trust code.

32. A system according to claim 28, wherein said means for comparing comprises calculating a security code, the security code comprising the inputted trust code, a fixed code assigned to the computing device performing the comparison, and at least one check digit computed based on the inputted trust code and the fixed code.

33. A system according to claim 28, wherein said means for transporting includes:
  means for inserting a component into the first computing device to receive the generated trust code; and
  means for inserting the component into the second computing device to deliver the inputted trust code.

34. A system according to claim 33, wherein the component is a memory component inserted into at least one data port of the respective first and second computing devices.

35. A system according to claim 28, wherein if said inputted trust code does not have the pre-defined relationship with said generated trust code, the content is not delivered to the second device.

36. A system according to claim 28, wherein if said inputted trust code does not have the pre-defined relationship with said generated trust code, and said content is a public key, a private key associated with the public key and the public key of the first computing device are invalidated for future use.

37. A system according to claim 28, wherein if said inputted trust code does not have the pre-defined relationship with said generated trust code, the generated trust code is invalidated for future use, unless independently randomly generated in the future.

38. A computer readable storage medium comprising computer executable instructions which when executed by a computer processor transmit content between a first device and a second device in a trusted manner in a network, the instructions comprising:
  instructions for generating a trust code by the second computing device without receiving user input;
  instructions for transporting the trust code, off the network, from the second computing device to the first computing device, said transporting comprising displaying the generated trust code at the second computing device and receiving an inputted trust code via a user interface into the first computing device; and
  instructions for performing an authentication exchange between the second computing device and the first computing device on the network, including comparing the inputted trust code to the generated trust code, wherein if the inputted trust code does not have a pre-defined relationship with the generated trust code, the content is not trusted for delivery to the second computing device,
wherein said instructions for performing an authentication exchange between the second computing device and the first computing device further comprise:
  instructions for the second computing device to poll the first computing device as to whether the first computing device has a code;
  instructions for the first computing device to communicate to the second computing device that the first computing device has a code;
  instructions for the second computing device to create a hash based on the generated trusted code and content to be delivered, and delivering the hash from the second computing device to the first computing device;
  instructions for the first computing device to store the hash;

instructions for the first computing device to transmit the inputted trust code to the second computing device; and instructions for the first computing device to determine whether or not the inputted trust code has a pre-defined relationship to the generated trust code, determining whether or not the inputted trust code has a pre-defined relationship comprising comparing the inputted trust code to the generated trust code;

instructions for transmitting an error from the second computing device to the first computing device if the inputted trust code does not have a pre-defined relationship to the generated trust code;

instructions for transmitting the content from the second computing device to the first computing device if the inputted trust code does have a pre-defined relationship to the generated trust code; and instructions for computing a hash value at the first computing device based on the inputted trust code and the content and determining if the computed value matches the stored hash value.

39. A computer readable storage medium according to claim 38, wherein the content is a public key.

40. A computer readable storage medium according to claim 38, wherein said instructions for transporting includes:

instructions for inserting a component into the second computing device to receive the generated trust code; and instructions for inserting the component into the first computing device to deliver the transported trust code.

* * * * *

UNITED STATES PATENT AND TRADEMARK OFFICE
CERTIFICATE OF CORRECTION

PATENT NO.         : 7,673,046 B2                                          Page 1 of 1
APPLICATION NO.    : 10/888132
DATED              : March 2, 2010
INVENTOR(S)        : Christian R. Lehew et al.

It is certified that error appears in the above-identified patent and that said Letters Patent is hereby corrected as shown below:

In column 18, line 51, in Claim 11, delete "comprises:" and insert -- comprises; --, therefor.

In column 20, line 42, in Claim 22, delete "of," and insert -- of: --, therefor.

In column 20, line 53, in Claim 22, delete "network," and insert -- network --, therefor.

In column 20, line 61, in Claim 22, delete "comprises:" and insert -- comprises; --, therefor.

Signed and Sealed this

Seventeenth Day of May, 2011

David J. Kappos
*Director of the United States Patent and Trademark Office*